United States Patent [19]

Dunnam

[11] 4,091,782
[45] May 30, 1978

[54] FUEL PREHEATING APPARATUS

[76] Inventor: Barnabas Dunnam, C.B. Box 1701, Lucedale, Miss. 39452

[21] Appl. No.: 701,424

[22] Filed: June 30, 1976

[51] Int. Cl.² ............................................. F02M 31/00
[52] U.S. Cl. .................... 123/122 E; 123/133; 123/122 H; 165/52; 165/51
[58] Field of Search ............... 123/122 E, 133, 122 H, 123/122 AA; 165/52, 154, 51; 261/144

[56] References Cited

U.S. PATENT DOCUMENTS

| 916,003 | 3/1909 | Osborn | 123/122 E |
| 1,133,845 | 3/1915 | Farnsworth | 261/144 |
| 1,318,068 | 10/1919 | Giesler | 123/122 E |
| 4,003,356 | 1/1977 | Naylor | 123/122 E |

FOREIGN PATENT DOCUMENTS 840,643  1/1938  France ........................ 123/133

*Primary Examiner*—Ronald H. Lazarus
*Attorney, Agent, or Firm*—Roylance, Abrams, Berdo & Farley

[57] ABSTRACT

A fuel preheating apparatus for use in internal combustion engines having a closed liquid coolant circuit including a coolant conduit through which heated liquid coolant flows and having a fuel storage tank having a fuel conduit for delivering fuel to the engine, the apparatus including a heat conducting coolant chamber located in the coolant conduit and an outer chamber surrounding the coolant chamber through which the fuel flows and in which the fuel is heated.

5 Claims, 5 Drawing Figures

FUEL PREHEATING APPARATUS

The present invention relates to an apparatus for preheating fuel, especially gasoline in an internal combustion engine, in order to increase the efficiency of the engine.

It has long been known that the efficiency of an internal combustion engine utilizing gasoline as a fuel can be improved by preheating the gasoline before it enters the carburetor of the engine. Typically, the liquid coolant used in a closed liquid coolant circuit for cooling the internal combustion engine is utilized to preheat the fuel since the liquid coolant is usually at about 180° F. While many attempts to formulate an acceptable system for preheating fuel have been made, wide spread acceptance of the systems has been lacking for various reasons. First, these systems are usually very expensive to purchase and are complicated to manufacture. Additionally, they are hard to install and require large modification of the pre-existing internal combustion engine system including the closed liquid coolant circuit for cooling the engine. Typically, these prior art systems require large amounts of additional piping and coils to modify the existing system and usually provide chambers for the liquid coolant through which a pipe containing the fuel flows. However, this creates a reservoir for the liquid coolant where extensive corrosion can take place and disrupts the normal flow of the liquid coolant, thereby possibly reducing the effectiveness of the cooling system.

Accordingly, it is an object of the present invention to overcome the drawbacks of the prior art and to provide a fuel preheating apparatus for increasing the efficiency of an internal combustion engine by increasing the miles per gallon of the fuel utilized in the engine.

A further object is to provide such an apparatus which is simple to make and easy to install, with very slight modification to a pre-existing typical internal combustion engine system.

Another object is to provide such an apparatus in which the liquid coolant flow in a closed liquid coolant circuit is not disrupted.

Another object is to provide such an apparatus wherein the fuel is kept in a chamber so that it is sufficiently heated to significantly increase the efficiency of the engine.

The foregoing objects are attained by providing a fuel preheating apparatus for use with an internal combustion engine having a closed liquid coolant circuit including a coolant conduit through which heated liquid coolant flows and having a fuel storage tank having a fuel conduit for delivering fuel to the engine, the apparatus comprising an inner chamber formed of heat conductive material; said inner chamber including a coolant inlet coupled to the coolant conduit for receiving heated liquid coolant from the coolant conduit, and a coolant outlet coupled to the coolant conduit for discharging liquid coolant to the coolant conduit; and an outer chamber surrounding at least a portion of the inner chamber, said outer chamber including a fuel inlet coupled to the fuel conduit for receiving fuel from the fuel storage tank via the fuel conduit, and a fuel outlet coupled to the fuel conduit for discharging fuel to the fuel conduit for delivery to the engine, whereby liquid coolant flows through said inner chamber via said coolant inlet and outlet, thereby heating said inner chamber, and whereby fuel flows through said outer chamber via said fuel inlet and outlet and, via contact with said heated inner chamber, is heated.

Thus, the fuel preheating apparatus is essentially a heat exchange device in which the liquid coolant flows through an inner chamber and the fuel flows through a outer chamber, surrounding the inner chamber, and is heated by contact with the heated inner chamber.

As described in more detail hereinafter regarding FIGS. 2, 3, 4 and 5, various embodiments of the apparatus can be utilized to increase the efficiency of an internal combustion engine by increasing the miles per gallon of fuel utilized. Each of these embodiments is easy to manufacture and easy to install by merely locating the inner chamber along the liquid coolant conduit which is provided in a typical internal combustion engine system and similarly the outer chamber is interposed along the fuel conduit which delivers fuel from a storage tank to the carburetor of the engine.

Thus, it is contemplated that a small section of the rubber hose in an internal combustion engine coolant circuit is removed with the inner chamber of the present invention coupling the two severed portions of that hose. Additionally, the fuel conduit coming from the storage tank can be diverted from its usual coupling to a carburetor and coupled to the fuel inlet of the apparatus outer chamber with an additional tube or pipe coupling the fuel outlet of the apparatus and the carburetor.

Other objects, advantages and salient features of the present invention will become apparent from the following detailed description, which, taken in conjunction with the annexed drawings, discloses a preferred embodiment of the present invention.

DRAWINGS

Referring now to the drawings which form a part of this original disclosure;

Figure 4:
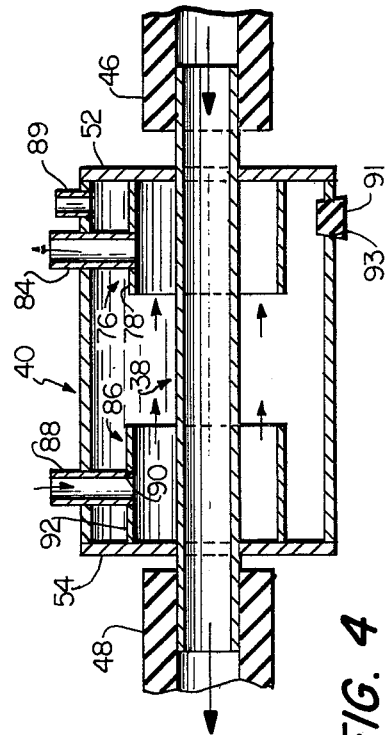
Figure 5:
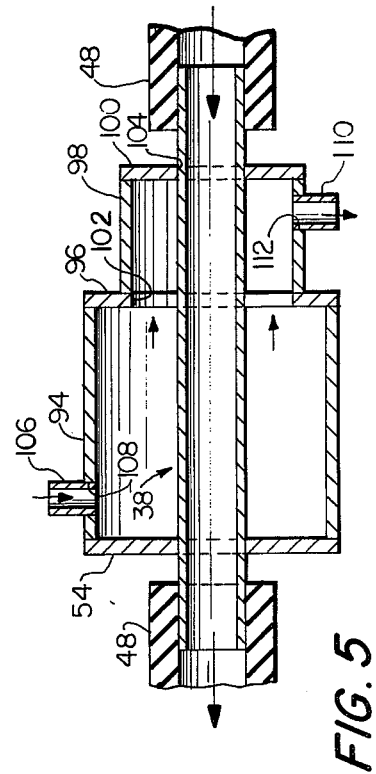

FIG. 4 is a longitudinal sectional view of an apparatus in accordance with the present invention modified to include two intermediate chambers; and FIG. 5 is a longitudinal sectional view of an apparatus in accordance with the present invention modified to include a shorter outer chamber as well as an exterior chamber having a diameter smaller than the outer chamber but larger than the inner chamber.

DETAILED DESCRIPTION OF THE INVENTION

Figure 1:
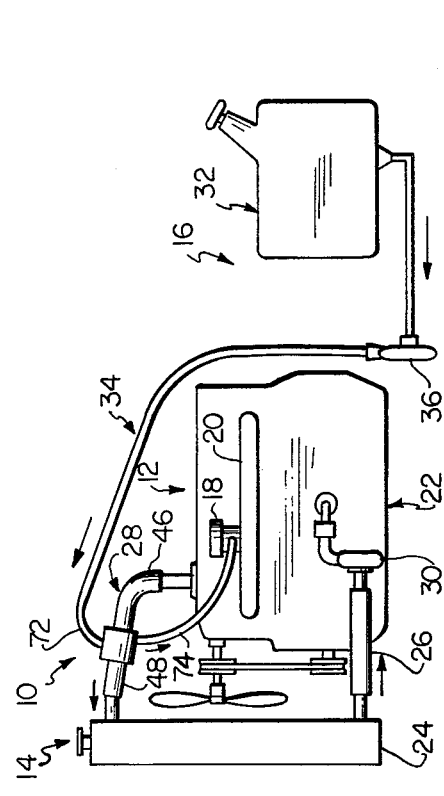
FIG. 1 is a side elevational view showing the fuel preheating apparatus of the present invention with an internal combustion engine having a closed liquid coolant circuit including a coolant conduit and a fuel storage tank having a fuel conduit for delivering fuel to the engine.

Referring now to FIG. 1, the fuel preheating apparatus 10 of the present invention is shown with an internal combustion engine 12 having a closed liquid coolant circuit 14 and a fuel supply system 16.

The internal combustion engine 12 includes a carburetor 18 and an intake manifold 20 coupled to the carburetor and to the cylinders of the engine 12, which are not shown.

The closed liquid coolant circuit 14 is coupled to the engine block 22 and comprises a radiator 24, a conduit 26 for delivering liquid coolant to the engine block and a second conduit 28 for returning the liquid coolant from the engine block to the radiator. A coolant pump 30 provided along conduit 26 is utilized to circulate the liquid coolant through the closed circuit.

As specifically shown in FIG. 1, the fuel preheating apparatus 10 is interposed along the second conduit 28 of the closed liquid circuit 14.

The fuel supply system 16 comprises a fuel storage tank 32, a fuel conduit 34 which conducts fuel from the storage tank 32, through the fuel preheating apparatus 10 and into the carburetor 18, and a fuel pump 36 interposed along the fuel conduit 34.

As specifically shown in FIG. 1, the fuel preheating apparatus 10 is directly interposed along the fuel conduit 34 so that fuel from the storage tank 32 before it enters the carburetor 18 passes through the fuel preheating apparatus 10.

EMBODIMENT OF FIG. 2

Figure 2:
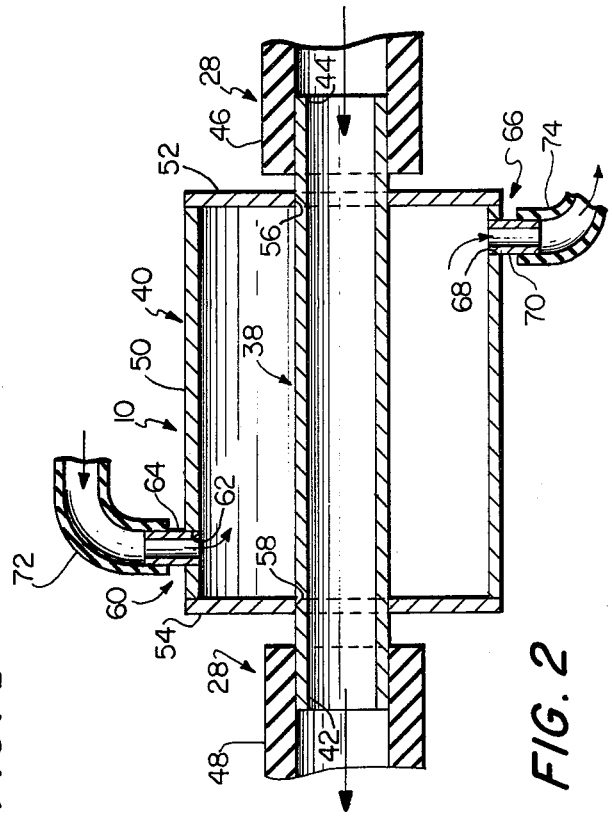
FIG. 2 is an enlarged longitudinal sectional view of the apparatus in accordance with the present invention utilized in the system of FIG. 1.

Referring now to FIG. 2, the fuel preheating apparatus 10 comprises an inner cylindrical chamber 38 and an outer cylindrical chamber 40 concentrically surrounding at least a portion of the inner chamber 38.

The inner chamber 38 is essentially an open ended, constant diameter, continuous cylinder, or pipe, which is longer than the outer chamber 40. A first open end 42 of the inner chamber 38 serves as a coolant inlet for the inner chamber and the second open end 44 at the other end of the inner chamber serves as the coolant outlet of the inner chamber. Open ends 42 and 44 extend past opposite ends of the outer chamber 40.

Referring again to FIG. 1, it is seen that the fuel preheating apparatus 10 by being interposed along the second conduit 28 essentially divides this coolant conduit into a first portion 46 which delivers coolant from the engine block to the fuel preheating apparatus and a second portion 48 which delivers liquid coolant from the fuel preheating apparatus back to the radiator 24. Thus, as seen in FIG. 2, the first portion 46 of the coolant conduit 28 is coupled to the second open end 44 of the inner chamber 48 and the second portion 48 of the coolant conduit 28 is coupled to the first open end 42 of the inner chamber 38. As shown in FIG. 2, the coolant conduit 28 is formed of rubber material, which is common, and can be fixedly secured to the inner chamber 38 by means of suitable clamps or other devices, not shown. In any event, the liquid coolant, which is heated in the engine block, flows steadily back to the radiator through the fuel preheating apparatus by passing from the first portion 46, through the inner chamber 38 and the second portion 48. The inner chamber 38 is formed of heat conductive material, such as metal, and is thereby heated by the passage of the heated liquid coolant therethrough. Since the inner chamber 38 is merely a cylindrical pipe or conduit, a reservoir of the liquid coolant is not present, so chances of corrosion are reduced in this area and additionally, there is no disruption of the flow of the liquid coolant.

The outer chamber 40 comprises an open ended cylinder 50, a first end plate 52 coupled to one end of the cylinder 50, and a second end plate 54 coupled to the other end of the cylinder 50. Each end plate is preferably circular having an outer diameter substantially equal to the outer diameter of cylinder 50, these plates being secured to the cylinder by any suitable means such as by welding. The first end plate 52 has a central aperture 56 which has a diameter substantially equal to the outer diameter of the inner chamber 38 and the end plate 52 is rigidly secured to the inner chamber 38 around aperture 56 such as by welding which also seals this coupling. Similarly, the second end plate 54 has a central aperture 58 having an inside diameter substantially equal to the outside diameter of the inner chamber 38 and the end plate 54 is rigidly secured to the inner chamber such as by welding which also provides a liquidtight seal between the plate and the inner chamber.

Adjacent end plate 54 is a fuel inlet 60 formed in the outer chamber 40 by means of an aperture 62 in the wall of the outer chamber 40 and a short tube 64 rigidly received in aperture 62.

Similarly, adjacent the other end plate 52 of the outer chamber 40 is a fuel outlet 66 comprising an aperture 68 formed in the wall of the outer chamber 40 and a short tube 70 rigidly received in the aperture. These tubes 64 and 70 are essentially diametrically opposed about the diameter of the cylinder 50 forming the outer chamber 40.

As seen in FIG. 1, the fuel conduit 34 has the fuel preheating apparatus 10 interposed therein thereby dividing it, relative to the fuel preheating apparatus, into an incoming portion 72 and an outgoing portion 74. Thus, the incoming portion 72 leads into the fuel preheating apparatus 10 from the storage tank 34 and the outgoing portion 74 extends from the fuel preheating apparatus 10 to the carburetor 18.

Similarly, referring to FIG. 2 it is seen that the incoming portion 72 of the fuel conduit 34 is coupled to the fuel inlet 60 of the outer chamber 40 and the outgoing portion 74 is coupled to the fuel outlet 66 of the outer chamber 40. While the portions 72 and 74 can be made of rubber as indicated in cross-section in FIG. 2, they could also be made of other materials such as metal. In any event, a pre-existing system can be utilized by merely severing the fuel conduit used therein and coupling one end to the fuel inlet 60 and the other end the fuel outlet 66. If necessary, an additional tube or hose can be utilized to conduct the fuel from the fuel preheating apparatus to the carburetor.

Referring to FIG. 2, as shown by the arrows therein, the fuel enters the fuel inlet 60 via incoming portion 72 of the fuel conduit 34 and exists from the outer chamber 40 via the fuel outlet 66 at which time it enters the outgoing portion 74 of the fuel conduit 34 and enters the carburetor 18 of the engine.

Since heated liquid coolant is constantly passing through the inner chamber 38, this inner chamber is heated and in turn heats the fuel passing through the outer chamber 40 by means of contact of the fuel with the inner chamber. Additionally, various radiation of heat from the inner chamber 38 causes the fuel located in the outer chamber to be heated. Additionally, the fuel in the outer chamber 40 remains in that chamber for a certain period of time so that it is adequately heated to a temperature which allows more efficient burning of the fuel once it reaches the cylinders of the engine. This in turn results in a higher miles per gallon efficiency of the engine.

EMBODIMENT OF FIG. 3

Figure 3:
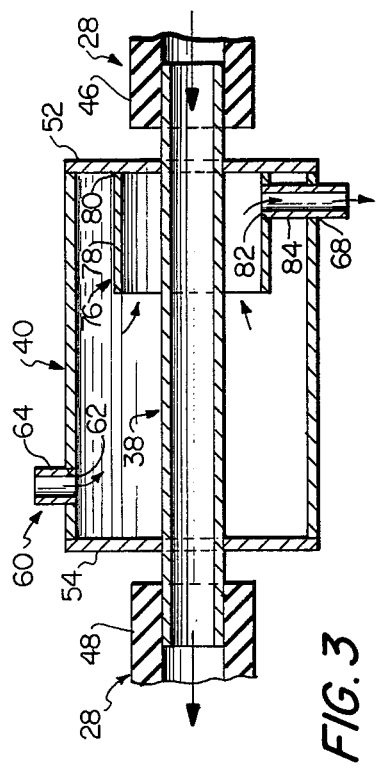
FIG. 3 is a longitudinal sectional view of an apparatus in accordance with the present invention modified to include an internal, intermediate chamber interposed between the inner and outer chambers.

As shown in FIG. 3, the fuel preheating apparatus 10 is modified by the addition of an intermediate chamber 76 having a diameter smaller than the outer chamber 40 but larger than the inner chamber 38. Additionally, tube 70 shown in FIG. 2 is modified, but the remaining parts of the apparatus shown in FIG. 3 are the same as those shown in FIG. 2, and are similarly numbered.

Thus, intermediate chamber 76 comprises a short cylindrical pipe 78 which is open-ended, having one end 80 secured, such as by welding, to end plate 52 of the outer chamber 40. The pipe 78 is concentric to the inner chamber 38 and has an aperture 82 therein which receives a tube 84 which extends through aperture 68 in the outer chamber 40.

The inner chamber 38 is coupled to the coolant conduit 28 as shown in FIG. 2, tube 64 is coupled to the incoming portion 72 of the fuel conduit 34, and tube 68 is coupled to the outgoing portion 74 of the fuel conduit 34.

Thus, the embodiment of FIG. 3 functions in a manner similar to that of FIG. 2 except that the fuel just about to exit via tube 84 is more intensely heated since it is located in the intermediate chamber 76 and therefore concentrated closer to the heated inner chamber 38. This embodiment is useful during the winter when the engine is rather cold and a quicker heating of fuel is accomplished.

EMBODIMENT OF FIG. 4

The embodiment of FIG. 4 is similar to that shown in FIG. 3 except that a second intermediate chamber 86 is positioned in contact with end plate 54 of the outer chamber 40, and the fuel inlet is formed by a tube 88 passing through aperture 62 in the outer surface of the chamber 40 and rigidly received in aperture 90 in the outer surface of the second intermediate chamber 86. This chamber 86 is similarly formed of a pipe 92 concentrically surrounding the inner chamber 38 and having a diameter substantially the same as the first intermediate chamber 76 located against end plate 52 of the outer chamber 40. Since the diameter of this second intermediate chamber 86 is smaller than the diameter of the outer chamber 40, fuel entering the apparatus via tube 88 is concentrated around the heated inner chamber 38 and therefore is heated to a higher temperature more quickly. With the addition of the intermediate chamber 76 at the other end of the other chamber 40, the embodiment of FIG. 4 provides quick and concentrated heating of the fuel and can be beneficial during cold ambient temperatures.

The operation of the embodiment of FIG. 4 is similar to that shown in FIGS. 2 and 3 insofar as the liquid coolant passes through the inner chamber 38 and the fuel passes through the outer chamber 40 via the inlet formed by tube 88 and the outlet formed by tube 84.

It should be noted that tubes 88 and 84 are both located, in FIG. 4, on the top of outer chamber 40. This placement assures that fuel will not surge out of tube 84 due to inertial forces exerted thereon during quick starts or stops of the automobile. The fuel outlet tubes in FIGS. 2, 3 and 5 can similarly be placed on the top of the apparatus 10.

The FIG. 4 embodiment also includes an air pressure relief vent 89 which is connected, via a conduit (not shown), with fuel storage tank 32. This allows air trapped in the interior of apparatus 10 to escape and helps to avoid vapor lock. This vent can also be used in FIGS. 2, 3 and 5.

Finally, the FIG. 4 embodiment also includes a drain plug 91 in a suitable drain aperture 93 in the bottom of chamber 40 to allow periodic draining, cleaning and flushing of this chamber to remove debris. A similar plug and drain can be used in FIGS. 2, 3 and 5.

EMBODIMENT OF FIG. 5

This embodiment modifies that shown in FIG. 2 by reducing the diameter of the outer chamber adjacent the fuel outlet from that chamber. This results in a more concentrated heating and a faster heating of the fuel as it is exiting from the outer chamber.

Thus, the outer chamber comprises a cylinder 94, an end plate 54, an end plate 96 opposite end plate 54, a second cylinder 98 having a diameter smaller than cylinder 94, and an end plate 100 closing the second cylinder 98. End plate 96 has a central aperture 102 having a diameter substantially the same as the second cylinder 98 which is larger than the outer diameter of the inner chamber 38 so that a passageway is formed from the interior of the cylinder 94 to the second cylinder 98. A central aperture 104 is formed in the end plate 100 which has a diameter substantially equal to the outer diameter of the inner chamber 38, and the end plate 100 is sealed and secured to the inner chamber 38, such as by welding, about aperture 104. Both end plates 96 and 100 are annular and are coupled to cylinders 94 and 98 by welding.

An inlet is formed in cylinder 94 by means of tube 106 being received in aperture 108 and a fuel outlet is formed by means of a tube 110 received in an aperture 112 in the second cylinder 98.

The operation of the embodiment of FIG. 5 is similar to that of FIG. 2 with the liquid coolant flowing through the inner chamber 38 and heating that chamber. In addition, fuel enters cylinder 94 via tube 106 and is heated by contacting the inner chamber 38. As the fuel flows through the outer chamber formed by cylinders 94 and 98, it is intensely heated in the second cylinder 98 just before it exits via tube 110 since the diameter of the second cylinder 98 is smaller than cylinder 94. This results in a faster and higher heating of the fuel which is beneficial during cold ambient temperatures.

Thus, various embodiments have been disclosed which provide a fuel preheating apparatus for an internal combustion engine which will preheat the fuel before it enters the engine's carburetor, thereby increasing the miles per gallon utilization of the fuel by the engine.

In actual tests of the subject invention on a 1968 Impala Chevrolet having a 327 cubic centimeter engine, the automobile experienced 25.25 miles per gallon, while without the present invention less than 14 miles per gallon was the usual efficiency of the automobile.

It should be noted that is has also been found in actual tests of the present invention that the thermostat utilized in the closed liquid coolant circuit should be adjusted so that the temperature of the heated liquid coolant remains below 180° F. to prevent vapor lock and allow a smooth running of the engine.

In addition, it has also been found to be highly beneficial if the ratio of the inside diameter of the inner chamber to the inside diameter of the outer chamber is about 1 to about 4. Additionally, it has been found to be highly beneficial if the ratio of the inside diameter of the inner chamber to the inside diameter of the intermediate chambers 76 and 86 is about 1 to about 2. Finally, it has been found highly beneficial to have the ratio of the inside diameter of the inner chamber to the inside diameter of the second cylinder 98, or exterior chamber, to be about 1 to about 2.

While various embodiments have been chosen to illustrate the invention, it will be understood by those skilled in the art that various changes and modifications can be made therein without departing from the scope of the invention as defined in the appended claims.

What is claimed is:

1. A fuel preheating apparatus for use with an internal combustion engine having a closed liquid coolant circuit including a coolant conduit through which heated liquid coolant flows and having a fuel storage tank having a fuel conduit for delivering fuel to the engine, said apparatus comprising:

an inner chamber formed of heat conductive material, said inner chamber including a coolant inlet coupled to the coolant conduit for receiving heated liquid coolant from the coolant conduit, and a coolant outlet coupled to the coolant conduit for discharging liquid coolant to the coolant conduit; and an outer chamber surrounding at least a portion of said inner chamber, said outer chamber including a fuel inlet coupled to the fuel conduit for receiving fuel from the fuel storage tank via the fuel conduit, and a fuel outlet coupled to the fuel conduit for discharging fuel to the fuel conduit for delivery to the engine, whereby liquid coolant flows through said inner chamber via said coolant inlet and outlet, thereby heating said inner chamber, and whereby fuel flows through said outer chamber via said fuel inlet and outlet and, via contact with said heated inner chamber, is heated, wherein said inner chamber is in the form of a cylinder said coolant inlet is a first open end of said cylinder, and said coolant outlet is a second open end of said cylinder, wherein said outer chamber is in the form of a cylinder concentrically surrounding at least a portion of said inner chamber, said outer chamber cylinder having a first end plate with an aperture therein receiving said inner chamber and having a diameter substantially equal to the outer diameter of said inner chamber, and having a second end plate with an aperture therein receiving said inner chamber and having a diameter substantially equal to the outer diameter of said inner chamber, and further including an intermediate open-ended cylinder concentrically surrounding a portion of said inner chamber within said outer chamber, said intermediate cylinder having a diameter greater than said inner chamber diameter, and having one end in contact with said outer chamber second end plate, and a tube interconnecting the interior of said intermediate cylinder and said outer chamber fuel outlet.

2. A fuel preheating apparatus according to claim 1 and further including a second intermediate open-ended cylinder concentrically surrounding a portion of said inner chamber within said outer chamber, said second intermediate cylinder having a diameter greater than said inner chamber diameter and having one end in contact with said outer chamber first end plate, and a second tube interconnecting the interior of said second intermediate cylinder and said outer chamber fuel inlet.

3. A fuel preheating apparatus for use with an internal combustion engine having a closed liquid coolant circuit including a coolant conduit through which heated liquid coolant flows and having a fuel storage tank having a fuel conduit for delivering fuel to the engine, said apparatus comprising:

an inner chamber formed of heat conductive material, said inner chamber including a coolant inlet coupled to the coolant conduit for receiving heated liquid coolant from the coolant conduit, and a coolant outlet coupled to the coolant conduit for discharging liquid coolant to the coolant conduit; and an outer chamber surrounding at least a portion of said inner chamber, said outer chamber including a fuel inlet coupled to the fuel conduit for receiving fuel from the fuel storage tank via the fuel conduit, and a fuel outlet coupled to the fuel conduit for discharging fuel to the fuel conduit for delivery to the engine, whereby liquid coolant flows through said inner chamber via said coolant inlet and outelt, thereby heating said inner chamber, and whereby fuel flows through said outer chamber via said fuel inlet and outlet and, via contact with said heated inner chamber, is heated, wherein said inner chamber is in the form of a cylinder, said coolant inlet is a first open end of said cylinder, and said coolant outlet is a second open end of said cylinder, wherein said outer chamber is in the form of a cylinder concentrically surrounding at least a portion of said inner chamber, said outer chamber cylinder having a first end plate with an aperture therein receiving said inner chamber and having a diameter substantially equal to the outer diameter of said inner chamber, and a second end plate with an aperture therein receiving said inner chamber and having a diameter larger than the outer diameter of said inner chamber, said outer chamber further including an exterior chamber extending from said second end plate, said exterior chamber having a diameter substantially equal to said second end plate aperture and having an end plate with an aperture for receiving said inner chamber, and said outer chamber fuel outlet being located in said exterior chamber.

4. A fuel preheating apparatus according to claim 1 wherein the ratio of the inside diameter of said inner chamber to the inside diameter of said intermediate chamber is about 1 to about 2.

5. A fuel preheating apparatus according to claim 3 wherein the ratio of the inside diameter of said inner chamber to the inside diameter of said exterior chamber is about 1 to about 2.

* * * * *